United States Patent [19]

Morehouse et al.

[11] Patent Number: 5,384,677
[45] Date of Patent: Jan. 24, 1995

[54] ARCHITECTURE FOR LOW-PROFILE DISK DRIVE DEVICE

[75] Inventors: James H. Morehouse, Jamestown; David M. Furay, Boulder; Robert A. Alt; Bruce D. Emo, both of Longmont, all of Colo.

[73] Assignee: Integral Peripherals, Inc., Boulder, Colo.

[21] Appl. No.: 254,466

[22] Filed: Jun. 6, 1994

Related U.S. Application Data

[63] Continuation of Ser. No. 24,900, Mar. 2, 1993, abandoned, which is a continuation of Ser. No. 765,352, Sep. 25, 1991, abandoned.

[51] Int. Cl.$^6$ ............................................. G11B 17/02
[52] U.S. Cl. ................................................. 360/99.12
[58] Field of Search ............... 360/98.01, 98.02, 98.08, 360/106, 99.08, 99.12

[56] References Cited

U.S. PATENT DOCUMENTS

| | | | |
|---|---|---|---|
| 4,561,035 | 12/1985 | McDorman | 360/99.12 |
| 4,772,972 | 9/1988 | Maeda | 360/106 X |
| 4,809,102 | 2/1989 | Hatchett | 360/98.08 X |
| 4,875,118 | 10/1989 | Kaymaram | 360/99.12 |
| 4,943,748 | 7/1990 | Shiozawa | 360/98.07 |
| 5,014,142 | 5/1991 | Nakanishi | 360/98.01 |

FOREIGN PATENT DOCUMENTS

| | | | |
|---|---|---|---|
| 59-77685 | 5/1984 | Japan | 360/98.01 |

Primary Examiner—A. J. Heinz
Attorney, Agent, or Firm—Skjerven, Morrill, MacPherson, Franklin & Friel

[57] ABSTRACT

An architecture for a low profile disk drive device wherein a lower surface of an information bearing disk abutting an upper surface of a spindle motor is not accessed by a read/write head for data storage or retrieval. The disk is used as a magnetic shield to protect reading and writing from an upper surface of the disk. The architecture facilitates lower profile construction because the spindle motor can be made with a larger diameter and thinner height. Memory capacity is not sacrificed because a greater portion of the remaining disk surfaces is utilized.

9 Claims, 9 Drawing Sheets

ARCHITECTURE FOR LOW-PROFILE DISK DRIVE DEVICE

This application is a continuation of application Ser. No. 08/024,900, filed Mar. 2, 1993, which is a continuation of Ser. No. 07/765,352, filed Sep. 25, 1991, now abandoned.

BACKGROUND OF THE INVENTION

1. Field of the Invention

The present application relates to disk drive devices in general, and in particular to an architecture for low-profile rigid disk drive devices.

2. Description of the Related Art

Rigid (hard) disk drive devices are well-known. Rigid disk drives are commonly comprised of one or more rigid information bearing disks fixedly mounted to a spindle motor, an actuator having a plurality of arms upon which are placed read/write heads for reading from or writing to the rigid disks, and associated control circuitry. The term "head-disk assembly," or HDA, as used below refers to the spindle motor, rigid disk combination, along with the read/write heads disposed between and adjacent the rigid disks. The term "low-profile" refers to the thickness of the complete disk drive package measured perpendicular to the diameter of the rigid disks.

The current trend in rigid disk drive design technology is toward devices having a low-profile package and containing disks having increasingly smaller outer diameters. This trend is fueled by the demand for smaller palmtop or laptop computers. As each generation of successively smaller disk drives is produced, the design architectures employed in preceding generations are modified to resolve design features which impede miniaturization.

Rigid disk drive devices currently under development contain rigid magnetic disks having outer diameters of 1.8 inches or less. Rigid disks of this size are designed with center holes, used to mount the disks to the spindle, which are as small as 10 mm in order to maximize the amount of disk surface area used for information storage. As a result, information storage is performed at increasingly smaller inner diameters of the disk. Most disk drive devices are operated at constant angular velocity, typically 3600 RPM. Consequently, the rate of change of magnetic flux caused by the magnetized areas on the magnetic disk decreases at the inner information tracks, thereby reducing the read signal. However, noise pickup from the spindle motor occurs undiminished, and may increase, as the head moves inward toward the center of the disk. Therefore, the increased noise acts to reduce a ratio between the read signal and noise even further, such that the signal to noise ratio reaches unacceptable levels.

Figure 10:
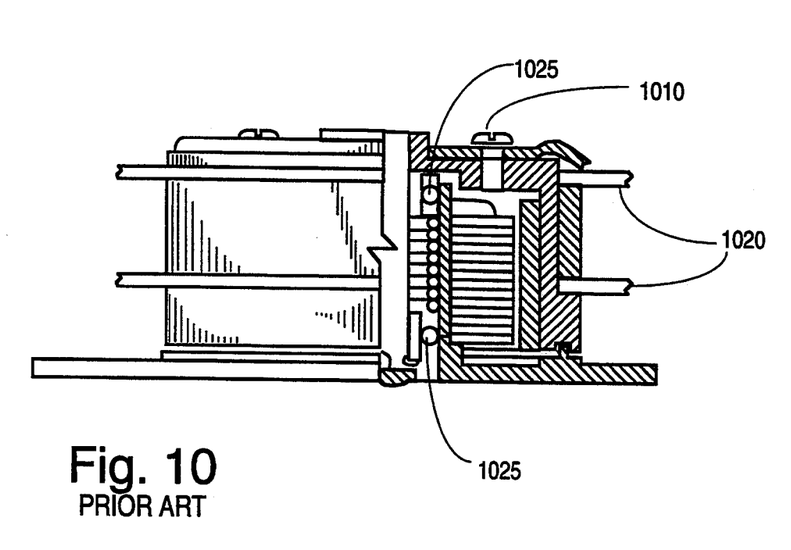
FIG. 10 is a side view of a prior art HDA incorporating an in-hub motor architecture.

An in-hub motor architecture may be used in low-profile disk drive devices incorporating rigid disks having an outer diameter of 2.5 inches or larger (FIG. 10). The in-hub motor architecture locates the spindle motor 1010 inside an inner diameter of the rigid disks 1020 between the spindle bearings 1025. The spindle motor 1010 is sized to fit within the hole defined in the rigid disks 1020, the size of the hole typically being fixed by standard industry practice.

An advantage of the in-hub motor architecture is that the overall thickness of the HDA can be reduced because the motor 1010 is disposed between the rigid disks 1020, as opposed to below the rigid disks. However, the spindle motor 1020 cannot be reduced to fit within the 10 mm hole of a 1.8 inch (or less) rigid disk. First, the hole diameter provides insufficient space for a rotor and stator. Additionally, reduction of the diameter of the in-hub motor is limited by the dimensions of the spindle bearings. The spindle bearings required to stabilize the rotational run-out of the recording disks have an irreducible height, even when used as a cartridge containing a pair of pre-loaded bearings. Moreover, reducing the size of the bearings results in a motor that is too fragile for use in portable equipment. In addition, reduction of the motor diameter reduces the motor volume, thereby producing a motor with insufficient torque to operate the disk drive. Therefore, the in-hub architecture is inadequate for disk drive devices incorporating disks having an outer diameter of 1.8 inches or less.

Figure 7:
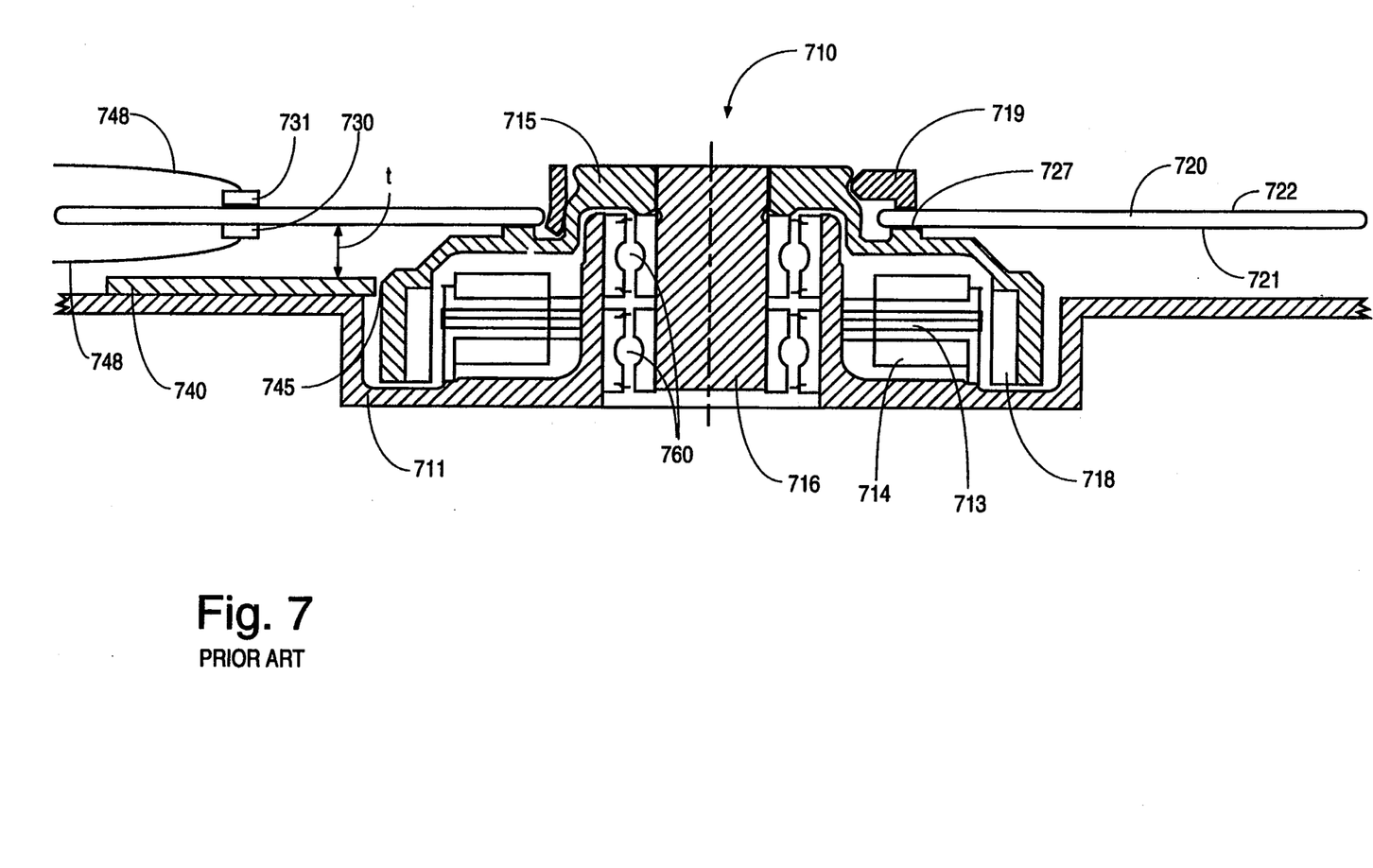
FIG. 7 is a sectional view of an HDA according to a prior art low-profile architecture.

A second prior art architecture incorporates a low-profile brushless DC motor 710 below a disk 720, as shown in FIG. 7. A pair of read/write heads 730 and 731 are disposed on arms 748 of an actuator 745 (shown in FIG. 8) which positions the read/write heads adjacent an upper surface 722 and lower surface 721 of the disk 720.

The motor 710 comprises a housing 711 in which is disposed a stator comprised of magnetic laminations 713 and coil windings 714. A rotor 715 is press fitted to a motor shaft 716 which is rotatably disposed in a central portion of the motor 710 by means of bearings 760 on an outer portion of the rotor are disposed rotor magnets 718. A clamp 719 holds the disk 720 to a mounting surface 727, both the clamp 719 and mounting surface 727 being carefully machined to provide a uniform clamping force on the disk 720. A rotor/stator gap 745 is located between the outer portion of the rotor and the housing 711. Disposed on an outer portion of the housing 711 is a ferrite shield 740. The ferrite shield 740 acts to protect the head 730 from magnetic flux produced by the motor 710. A space t separates the lower surface 721 of the disk 720 and an upper surface of the ferrite shield. The space t, typically 1.5 mm, is the necessary distance between the ferrite shield 740 and the disk 720 to allow access of the head 730.

The benefit of the low-profile architecture is that small diameter disks may be used without sacrificing motor size. However, when the read/write head 730 is disposed near the rotor/stator gap 745 between the spindle motor 710 and the lower data surface 721, the read/write head 730 experiences severe electromagnetic interference from the commutating pulses emanating from the motor 710. The interference results because of a space separating the stationary ferrite shield 740 from the rotating rotor 715. The small space between the ferrite shield 740 and the rotor 715 allows magnetic flux to create interference in the vicinity of the rotor/stator gap 745. This interference has been found to cause the playback signal to contain errors, rendering invalid retrieval of stored information or servo signals, at times making these signals impossible to recover.

Figure 8:
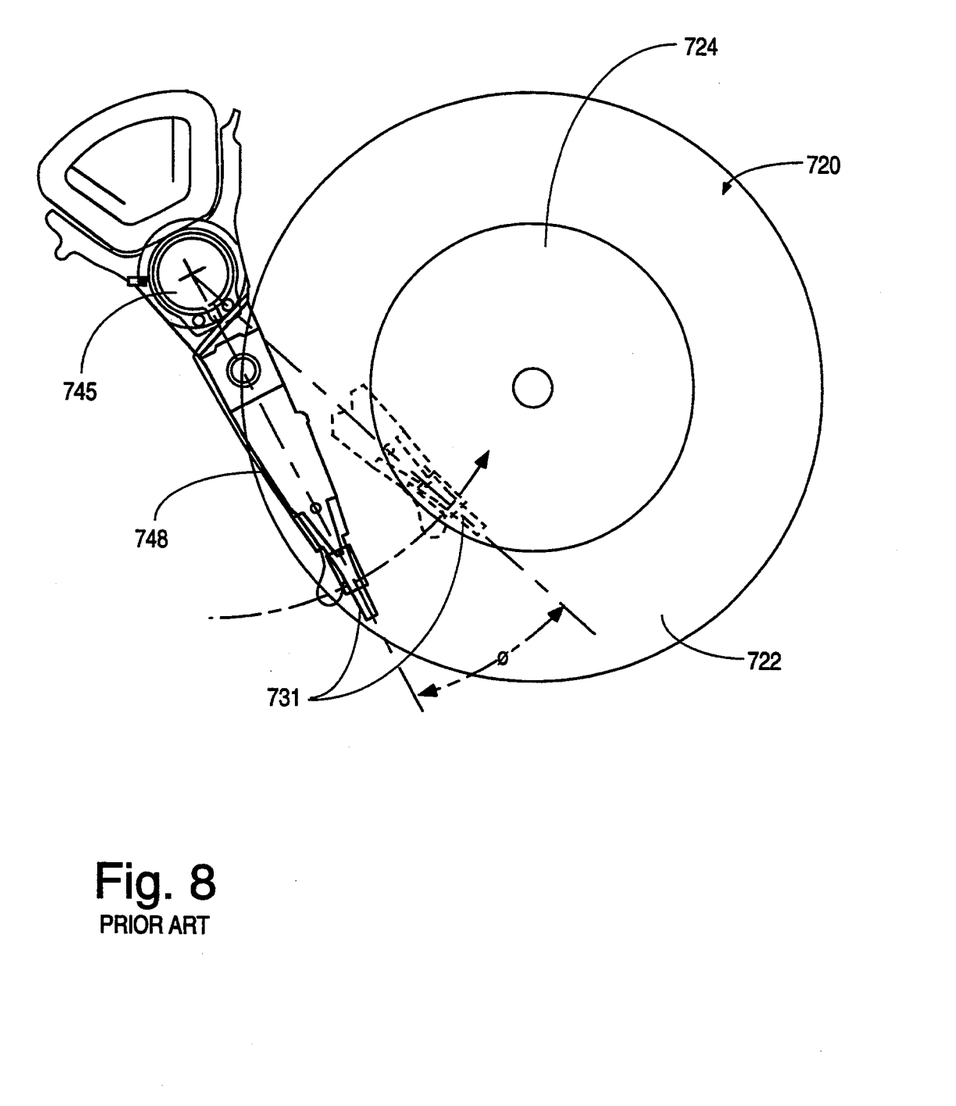
FIG. 8 is a plan view of the disk drive device of FIG. 7.

One solution to this problem has been to restrict the access of the read/write head 730 to storage tracks of the disk 720 which are fully protected by the ferrite shield 740. This solution obviously reduces the amount of disk area available for information storage by restricting the accessed disk area to the more outer diameters of the lower surface 721. In addition, present disk drive devices commonly fix all read/write heads to a common actuator mechanism. Therefore, restricting the access of the read/write head 730 to a sweep angle θ, as shown in FIG. 8, also restricts the access of the read/write 731. This results not only in sacrificing the inner diameter storage area on the lower surface 721, but also an equal loss of storage area on the upper surface 722. This loss also occurs on any additional disks disposed above disk 720 on a multi-disk prior art HDA.

Another solution is to limit the outer diameter of the motor 710, thereby effectively moving the rotor/stator gap 745 toward the central portion of the motor 710. This solution allows access to storage tracks located at a smaller diameter of the disk 720 than with a larger diameter motor. However, motor power is a function of motor volume. Therefore, a reduction in motor diameter requires that the thickness of the motor 710, and hence the thickness of the entire HDA, be increased in order to produce the same amount of power. In addition, since signal level decreases as the read/write head reads tracks located closer to the rotor shaft, even if the rotor/starter gap 745 is moved inward, the signal to noise ratio decreases as inner tracks are accessed. Thus, there is a conflict between reducing motor diameter and reducing motor thickness.

In balancing the conflict between the motor diameter and motor thickness, a motor having a diameter of approximately 22 mm and a thickness of approximately 10 mm is suitable for disk drive devices incorporating the low-profile motor described above and rigid disks having a diameter of 1.8 inches. Including the space t below the disk 720 and an additional space t above the upper surface 722, and including a disk thickness of 0.6 mm, the minimum thickness of the HDA shown in FIG. 7, as measured from the bottom surface of the housing 711 to the top surface to the rotor shaft 716, is approximately 13.6 mm. In practice an additional space is necessary above the heat 731.

Figure 9A:
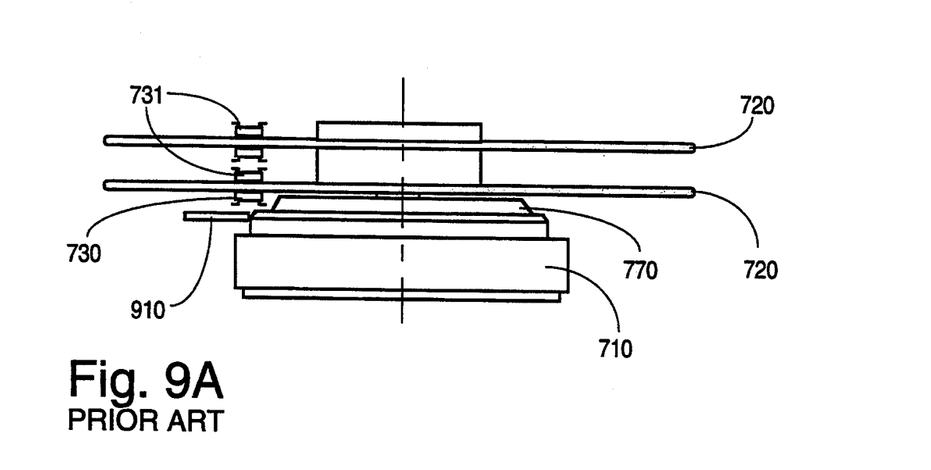
FIGS. 9A and 9B are side views of two- and three-disk embodiments of HDAs incorporating a prior art low-profile motor architecture.
Figure 9B:
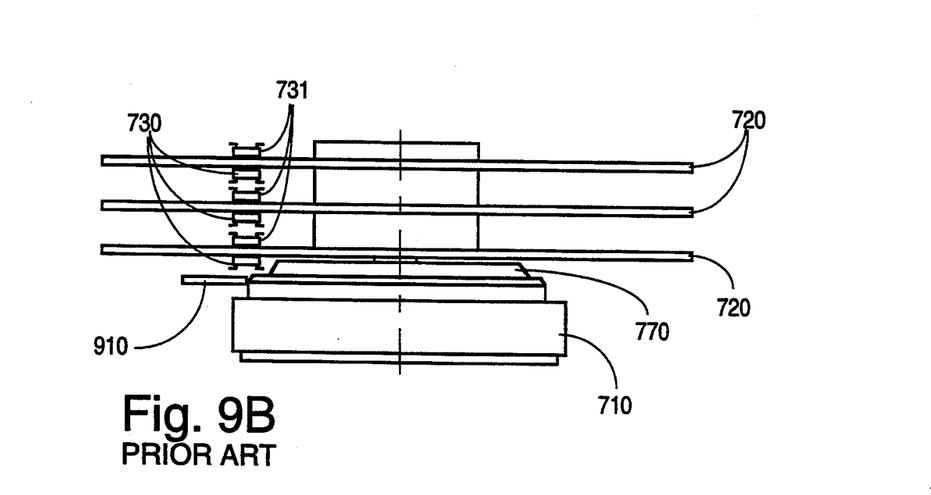

FIGS. 9A and 9B illustrate two- and three-disk embodiments of HDAs incorporating the prior art low-profile architecture. The spacing between adjacent disks 720 is approximately two times the space t, or 3.0 mm, to provide space for the two read/write heads 730 and 731 disposed between the adjacent disks. Thus, each additional disk 720 increases the thickness of the prior art HDA by 3.6 mm (two spaces t and 0.6 mm for the thickness of the additional disk). Therefore, the thickness of the two-disk, four-head HDA of FIG. 9A is approximately 17.2 mm, and the thickness of the three-disk, six-head HDA of FIG. 9B is approximately 20.8 mm. Ferrite shields 910 are illustrated in both FIGS. 9A and 9B.

It is an objective of the present invention to provide a design architecture for reduced-diameter, low-profile disk drive devices which overcomes the limitations. of the prior art design architectures.

It is further an objective of the present invention to provide a design architecture which reduces the thickness of a disk drive device while substantially maintaining or increasing its information storage capacity.

It is further an objective of the present invention to provide a design architecture which increases the amount of usable storage area on magnetic disks, while decreasing the amount of signal error caused by the proximity of the magnetic head to the spindle motor.

SUMMARY OF THE INVENTION

An architecture for low-profile disk drive having an HDA composed of a low-profile DC brushless spindle motor having a rotor connected to one or more information bearing disks, and an actuator having a plurality of read/write heads disposed to read from or write to the information bearing disks. The spindle motor substantially abuts a lower surface of a first information bearing disk. The lower surface of the first information bearing disk is not used for information storage, while one or both surfaces of some or all additional disks stacked above the first disk may be used for information storage.

In a single disk embodiment comprising one disk and one read/write head, an upper surface of the disk is used for information storage. Although one surface is used, this embodiment achieves approximately 70% of the storage capacity of a prior art one-disk, two-head HDA. This storage capacity is achieved because the read/write heads access information tracks disposed closer to the center of the disk than tracks accessed by the read/write heads of the prior art HDA. In addition, because the spindle motor is constructed with a smaller thickness and a gap between the motor and the lower surface of the first disk is eliminated, a lower profile is achieved.

A multi-disk embodiment comprises a first and one or more second information bearing disks. One surface of the first disk is used and one or both surfaces of the one or more second disks are used for information storage.

DESCRIPTION OF THE PREFERRED EMBODIMENTS

Figure 1:
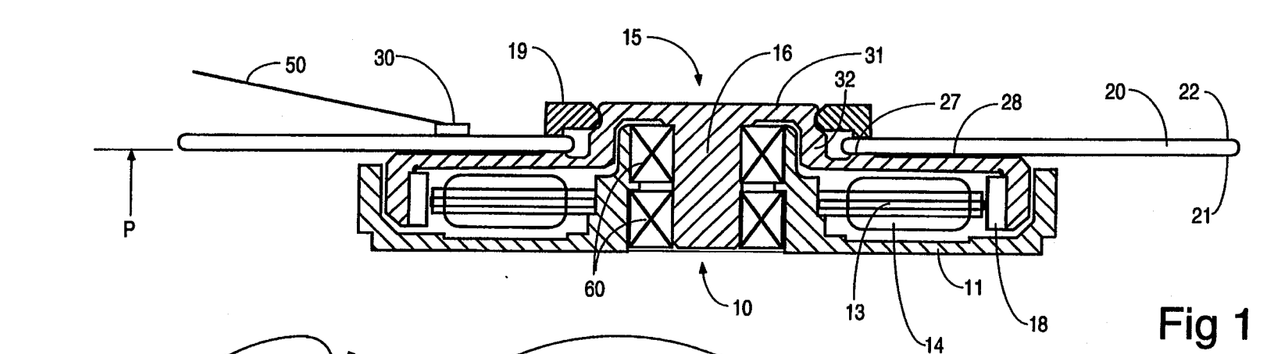
FIG. 1 is a section view of an HDA incorporating an architecture according to the present invention.
Figure 2:
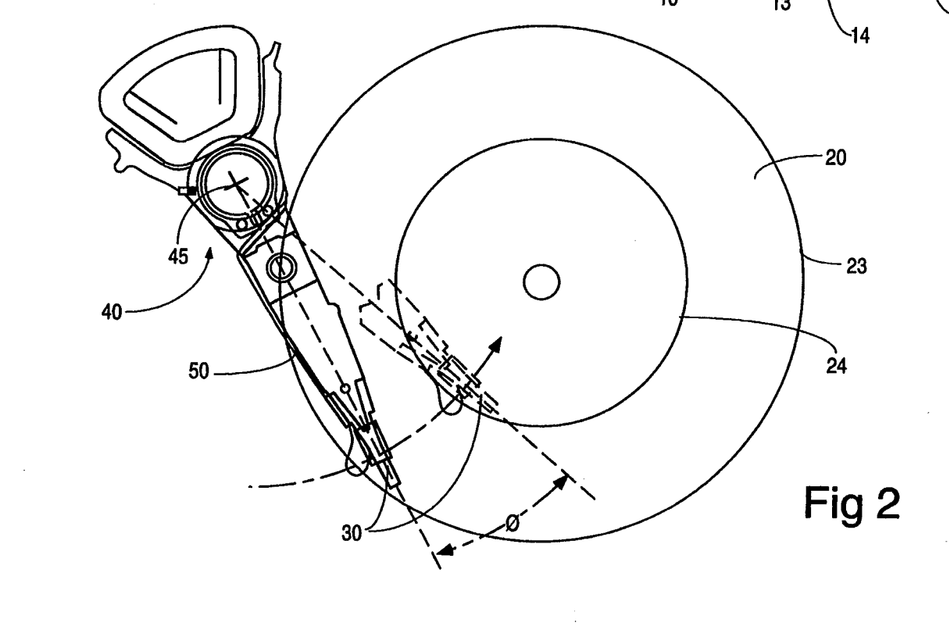
FIG. 2 is a plan view of the disk drive device of the present invention.

Referring to FIGS. 1 and 2, an architecture of the present invention incorporates a head-disk assembly (HDA) which comprises a spindle motor 10, an information bearing disk 20, and one or more read/write heads 30 which are disposed on an actuator 40 to read from or write to the disk 20.

The read/write head 30 is disposed on arm 50 which is fixedly disposed on an actuator 40. The actuator 40 pivots about a shaft 45 to move the read/write head 30 over a sweep angle φ between an outer periphery 23 and an inner periphery 24 of the disk 20.

The spindle motor 10 is preferably a low-profile DC brushless motor as shown in FIG. 1. The spindle motor 10 is comprised of a motor housing 11 within which is disposed a stator. The stator comprises magnetic laminations 13 and coil windings 14. A rotor 15 includes a rotor shaft 16 which is rotatably disposed on the spindle motor 10 by means of spindle bearings 60. The rotor 15 further includes a cap 31 connected to one end of the rotor shaft 16, a cylindrical portion 32 connected at a first end to the cap 31, the cylindrical portion 32 being coaxial with the rotor shaft 16, and a disk-shaped portion connected to a second end of the cylindrical portion 32. Disposed on the outer periphery of the disk-shaped portion of the rotor 15 are rotor magnets 18. On an upper surface 28 of the disk-shaped portion of the rotor 15 is machined a disk mounting surface 27. The disk mounting surface 27 provides a relief for machining purposes for precisely positioning the disk 20 relative to the read write head 30 and for applying a uniform force on a lower (first) surface 21 of the disk 20. The disk mounting surface 27 separates the lower surface 21 of the disk 20 from the upper surface 28 of the disk-shaped portion the rotor 15 by a minimal distance of approximately 0.13 mm. Therefore, the disk 20 substantially abuts the disk-shaped portion of rotor 15.

Disposed on the disk mounting surface 27 is the disk 20, the disk 20 being held against the disk mounting surface 27 by means of a clamp 19 having a second diameter smaller than the first diameter of the disk-shaped portion of the rotor 15. Similar to the mounting surface 27, the clamp 19 has a precision surface to apply a uniform clamping force on an upper (second) surface 22 of the disk 20.

The architecture of the present invention is characterized in that the lower surface 21 of the disk 20 substantially abuts the upper surface 28 of the rotor 15. In addition, the architecture of the present invention is characterized in that the lower surface 21 of the disk 20 is not used for information storage; that is, the read/write head 30 incorporated into a disk drive device incorporating the architecture of the present invention are located above a plane P defined by the lower surface 21 of the disk 20. Finally, the architecture of the present invention is characterized in that the disk 20 is used as a shield for information read from or written to the upper surface 22 of the disk 20 and neither a ferrite nor other shield is required.

The architecture of the present invention facilitates modifications to the spindle motor 10 which result in a low-profile design well-suited for disk drive devices incorporating disks having an outer diameter of 1.8 inches or less. There is essentially no space, similar to the space t (discussed in the Background) between the upper surface 28 of the rotor 15 and the lower surface 21 of the disk 20, as is required in the prior art low-profile architecture. Instead, the flat upper surface 28 of the rotor 15 substantially abuts the lower surface 21 of the disk 20. In addition, the outer diameter of the spindle motor 10 is not limited as in the prior art low-profile architecture. Since motor power is substantially related to motor volume, the spindle motor may be made with a larger diameter and lower profile without sacrificing power. For use with a 1.8 inch disk, the spindle motor diameter may be approximately 31 mm, the thickness reduced to approximately 5.0 mm and the resulting motor would still have the same volume, and power, of the prior art motor of FIG. 7. Because there is essentially no space between the disk 20 and the motor 10, the minimum thickness of a single disk, one-head HDA incorporating the present architecture is approximately 7.1 mm (adding 1.5 mm for the necessary read/write head clearance). This is approximately one half of the 13.6 mm thickness of a prior art one-disk, two-head HDA, shown in FIG. 7.

In addition a spindle motor with a larger diameter and thinner profile is superior to smaller diameter motors in that they produce a larger torque constant, lower rotational jitter, increased inertia and allow the motor bearings to be placed inside the stator to further reduce HDA height.

In addition to the lower profile, an HDA incorporating the architecture of the present invention provides an additional advantage over the prior art low-profile architecture in that the read/write head 30 disposed over the upper surface 22 is capable of accessing information tracks closer to the rotor shaft 16. The accessible disk storage space is increased over the prior art low-profile architecture shown in FIG. 7 in that the sweep angle $\phi$ is not restricted by the lower surface 21 of the disk 20, as in the prior art. The amount of additional information track storage space per disk surface accessed by the read/write head 30, located between the outer (first) diameter of the disk-shaped portion of the rotor 15 and the outer (second) diameter of the spacer 19, is approximately 40% greater than the storage space accessed using the preferred motor size of the prior art low-profile architecture and disks having the same size and density. Therefore, a greater storage capacity per disk surface is achieved.

Also characteristic of the present architecture is a reduction of the number of read/write heads 30 needed to access substantially the same or more information surface on the disk 20 and any additional disk mounted above the disk 20. The reduction in the number of read/write heads also reduces the spindle motor starting torque in the case of a contact start-stop head/disk interface, thereby conserving battery power in portable applications. A similar advantage is achieved in the case of dynamic loaded heads where the actuator load/unload torque is also proportionally reduced.

Also characteristic of the present architecture is that the rotor 15 acts as shielding member for electrical and magnetic fields emanating from the spindle motor 10 (FIG. 2). The disk 20 acts as a further shielding member for the upper surface 22, which is used for information storage, by means of the magnetic disk coating on the lower surface 21 and eddy current shielding due to the conductive disk substrate. Therefore, no ferrite shield is necessary as in the prior art architecture of FIG. 7.

Comparison between the HDA of FIG. 1 and the one disk, 2 head prior art HDA shown in FIG. 7 yields the following results. First, as discussed above, the height of the HDA of FIG. 1 is approximately one half the height of the prior art HDA of FIG. 7. Second, because the rotor 15 and disk 20 act as shields, it is less likely a read/write error will occur in the HDA of FIG. 1 than in the prior art HDA of FIG. 7. Finally, because the read/write head 30 accesses 40% more storage area per disk surface than the head 730 of FIG. 7, the single-head HDA of FIG. 1 provides approximately 70% of the information storage capacity of the two-head HDA of FIG. 7. Given the lower-profile and greater shielding provided with the present invention, a 30% decrease in storage capacity is an acceptable trade-off in some situations.

Figure 3:
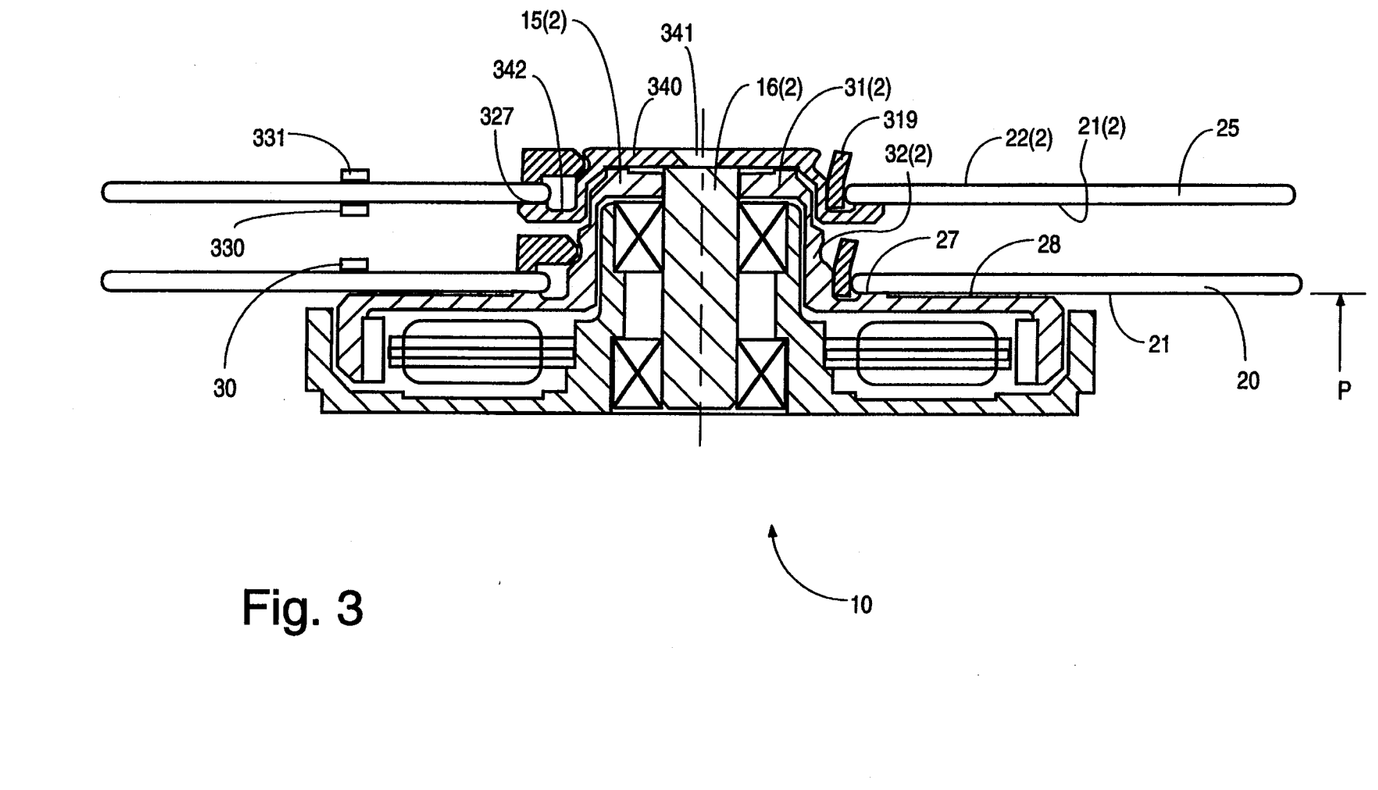
FIG. 3 is a section view of a two-disk HDA according to the present invention.

A two-disk HDA according to the present invention is shown in FIG. 3. The two-disk HDA comprises a motor 10 incorporating an extended rotor shaft 16(2). A modified rotor 15(2) is press-fitted onto the rotor shaft 16(2). The modified rotor 15(2) includes a cap 31(2)

connected to one end of the rotor shaft 16(2), a cylindrical portion 32(2) connected at a first end to the cap 31(2), the cylindrical portion 32(2) being coaxial with the rotor shaft 16(2), and a disk-shaped portion connected to a second end of the cylindrical portion 32(2). A first disk 20 is clamped to the upper surface 28 of the disk-shaped protion of the rotor 15(2) as in the single-disk embodiment shown in FIG. 1. In addition, a top cap 340 is mounted by means of a screw 341 to the top of the rotor shaft 16(2). The top cap 340 has a depending portion 342 which defines a second mounting surface 327. A second disk 25 is clamped to the second mounting surface 327 by means of a second clamp 319. Second and third read/write heads 330 and 331 are mounted to arms (not shown) of the actuator (not shown) and disposed adjacent the lower surface 21(2) and upper surface 22(2) of second disk 25. In a similar manner, one or more additional disks may be mounted to the rotor of FIG. 3.

Since both sides of the one or more additional disks are used for information storage, the architecture of the two-disk HDA of FIG. 3 is characterized in that, if the number of information bearing disks mounted on the spindle motor is designated as n, the number of read/write heads used is defined by the equation $2n-1$.

Figure 4:
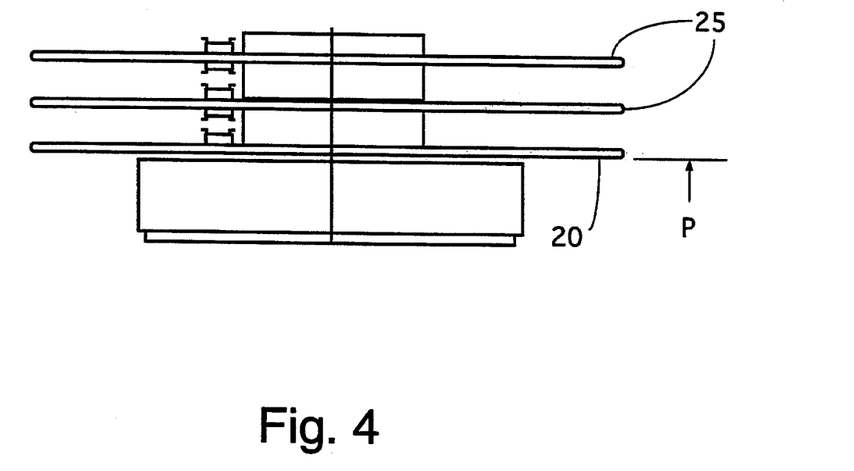
FIG. 4 is a simplified side view of a three-disk HDA according to the present invention.

The architecture of the two-disk HDA of FIG. 3 is further characterized in that, where first disk 20 and the one or more additional disks 25 are incorporated into an HDA with the first disk 20 disposed adjacent the spindle motor 10, the lower surface 21 of the first disk 20 defining a plane P (shown in side view in FIGS. 3 and 4), one read/write head 30 being disposed adjacent the first disk 20, and two read/write heads 330 and 331 being disposed adjacent each of the one or more second disks 25, all of the read/write heads are disposed only on a side of the plane P opposite to a side containing the spindle motor 10.

Assuming the thickness of the motor 10 shown in FIG. 3 is approximately 5 mm, as measured from a bottom surface of the motor 10 to the upper surface 28, the height of the two-disk embodiment is calculated as follows. As in the prior art, the distance between the upper surface 22 of the first disk 20 and the lower surface 21(2) of the second disk is approximately two times the space t, or approximately 3.0 mm. Also as in the prior art, an additional 1.5 mm is necessary above the second disk 25 for disposing the read/write head 331. Finally, assuming the disk thickness is 0.6 mm, the height of the two-disk HDA of FIG. 3 is approximately 10.7 mm.

The two-disk HDA of FIG. 3 yields significant advantages over the two-disk, four-head prior art HDA shown in FIG. 9A. As discussed above, the reduction of motor height by approximately one-half and the elimination of the space between the motor and the lower disk 20 yields an approximate 6.5 mm reduction in thickness over the prior art HDA of FIG. 9A. Moreover, because the read/write head 30 accesses information tracks closer to the rotor shaft 16(2), the sweep angle $\phi$ (shown in FIG. 2) of the two-disk HDA of FIG. 3 is significantly larger than the sweep angle $\theta$ of the prior art embodiment of FIG. 9A. Accordingly, a read/write head accesses 40% more disk surface area in the HDA of FIG. 3 over the HDA of FIG. 9A. Therefore, the HDA of FIG. 3 has 1.4 times the information storage capacity per disk surface over the prior art HDA of FIG. 9A. Accordingly, the three disk surfaces of the HDA of FIG. 3 provide a storage capacity which is approximately 4% greater than the four disk surfaces of the prior art HDA of FIG. 9A.

The comparison between the HDA of FIG. 3 and prior art HDA of FIG. 9A is summarized in the following table:

|  | Prior Art Two-Disk Architecture (FIG. 9A) | Two-Disk Present Architecture (FIG. 3) |
| --- | --- | --- |
| Disk Storage Area |  |  |
| Outer Data Radius; | 21.56 mm | 21.56 mm |
| Inner Data Radius: | 14.80 mm | 11.11 mm |
| Relative Data Capacity per Disk Surface; | 1.0 | 1.39 |
| Number of Disks: | 2 | 2 |
| Number of Available Data Surfaces: | 4 | 3 |
| Total Relative Storage Capacity: | 4.0 | 4.17 |
| Capacity Ratio: | 1.0 | 1.0425 |
| HDA Thickness |  |  |
| Motor Thickness | 10 mm | 5 mm |
| Total Disk Thickness (Approximately 0.6 mm per disk) | 1.2 mm | 1.2 mm |
| Number of Heads | 4 | 3 |
| Total Space needed for heads (Approximately 1.5 mm per head) | 6 mm | 4.5 mm |
| Approx. HDA thickness: | 17.2 mm | 10.7 mm |

Because of the approximate reduction in thickness of one-third and the slight increase in storage capacity, the embodiment shown in FIG. 3 is preferable to the prior art HDA of FIG. 9A. In addition, further increases in storage capacity are achieved with the three-disk, five-head HDA shown in FIG. 4, as compared with the three-disk, six head prior art HDA of FIG. 9B.

Figure 5A:
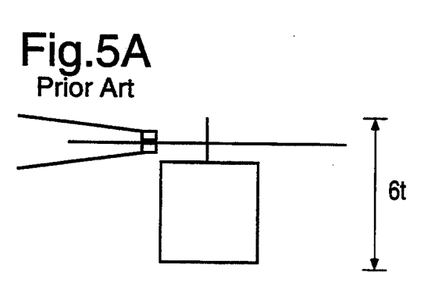
FIGS. 5A–5H are simplified side views of a various prior art and present HDA embodiments.
Figure 5B:
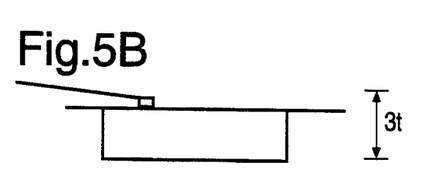
Figure 5C:
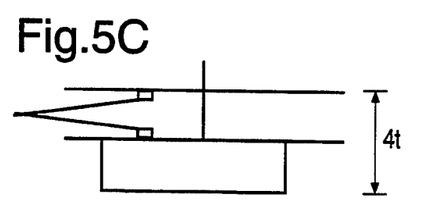
Figure 5D:
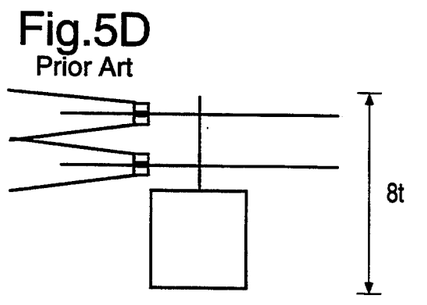
Figure 5E:
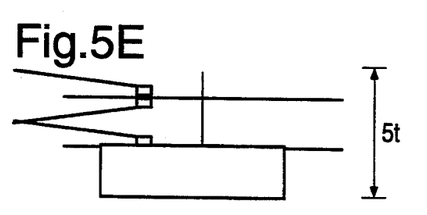
Figure 5F:
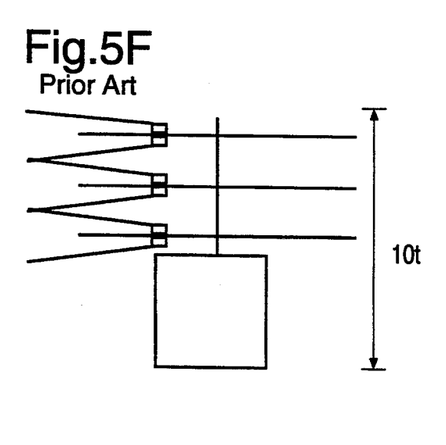
Figure 5G:
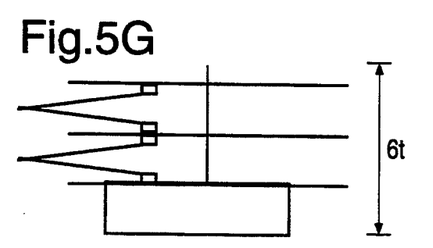
Figure 5H:
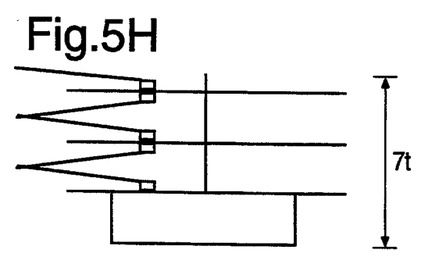

FIGS. 5A–5H illustrate various simplified HDAs according to the present invention and the prior art architecture. FIGS. 5A–5H, in conjunction with the below table, are provided to better illustrate the advantages of the present architecture over the prior art low-profile architecture. In addition, FIGS. 5C and 5G illustrate two other possible embodiments according to the architecture of the present invention. For simplification purposes, the height of the prior art motors in FIGS. 5A, 5D and 5F are assumed to be four times the space t (discussed in the Background, above), or 6 mm. The motors of the present embodiments shown in FIGS. 5B, 5C, 5E, 5G and 5H are all assumed to be two times the space t, or 3 mm. In addition, the space taken up by the thickness of the disks is disregarded. Finally, the storage capacity per disk surface accessed by the read/write heads of the present embodiments is assumed to be 1.4 times the storage capacity per disk surface accessed in the prior art HDAs.

With the above assumptions, comparisons between the prior art HDAs and the HDAs according to the present invention are listed in the below table. Note that the height ratio is the thickness of the "HDA2" divided by the thickness of "HDA1". Similarly, the capacity ratio is the capacity of "HDA2" divided by the capacity of "HDA1".

| Comparison HDA1 vs. HDA2 | Thickness HDA1 | Capacity HDA1 | Thickness HDA2 | Capacity HDA2 | Height Ratio | Capacity Ratio |
| --- | --- | --- | --- | --- | --- | --- |
| 5A vs. 5B | 6t | 2 × 1 = 2 | 3t | 1 × 1.4 = 1.4 | ½ | 0.7 |
| 5A vs. 5C | 6t | 2 | 4t | 2.8 | ⅔ | 1.4 |
| 5D vs. 5E | 8t | 4 | 5t | 4.2 | ⅝ | 1.05 |
| 5D vs. 5G | 8t | 4 | 6t | 5.6 | ¾ | 1.4 |
| 5F vs. 5H | 10t | 6 | 7t | 7.0 | 7/10 | 1.16 |

As noted from the above table, comparison between two-head prior art HDA of FIG. 5A and the two-head HDA of FIG. 5C yields an increase in storage capacity of approximately 40%, while requiring one-third less HDA thickness. Similarly, a comparison between four-head prior art HDA of FIG. 5D and the four-head HDA of FIG. 5G yields an increase in storage capacity of approximately 40%, while requiring one-fourth less HDA thickness.

Figure 6A:
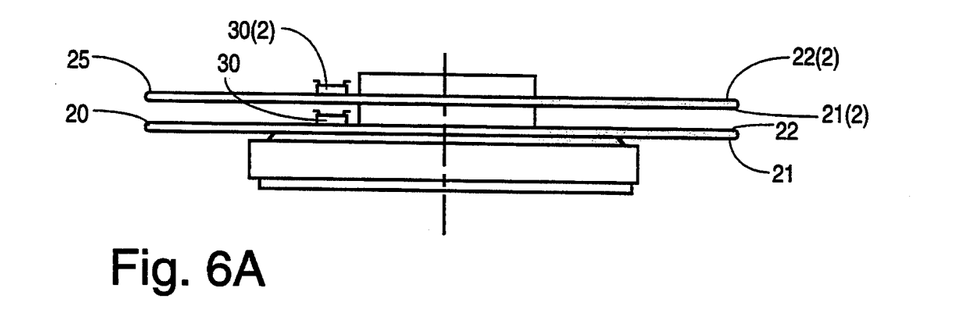
FIGS. 6A and 6B are side views of alternative embodiments of the present invention incorporating two- and three-disk structures.
Figure 6B:
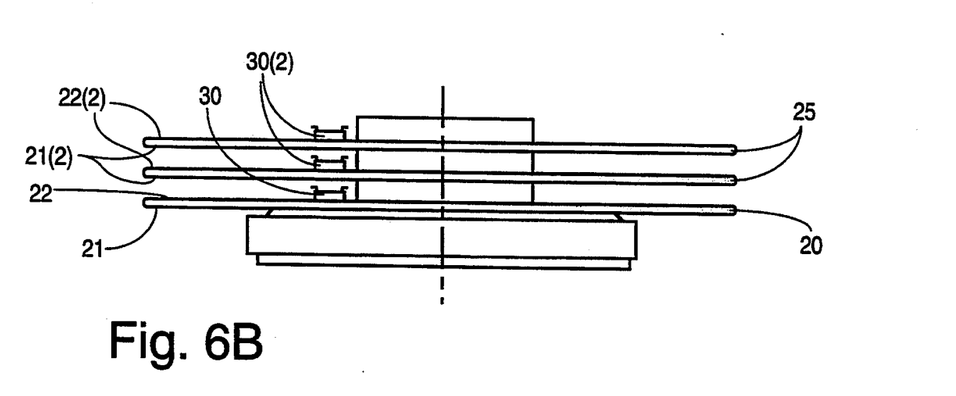

One skilled in the art would recognize from the embodiments shown in FIGS. 5A-5H that many variations are possible in the number of heads versus the number of disks in order to meet specific requirements. For instance, the HDAs of FIGS. 6A and 6B illustrate a two-disk, two-head HDA, and a three-disk, three-head HDA, respectively, according to the present invention. Each of these HDAs would provide approximately 70% of the storage capacity of the two- and three-disk HDAs of FIGS. 9A and 9B, but would require much less HDA thickness.

We claim:

1. An architecture for a low profile rigid disk drive device having a single information bearing disk comprising:
   a housing;
   a spindle motor disposed in said housing, said spindle motor having a rotor, said rotor including:
   a rotor shaft,
   a cap connected to one end of the rotor shaft,
   a cylindrical portion having a first end connected to the cap, the cylindrical portion being coaxial with the rotor shaft, and
   a disk-shaped portion connected to a second end of the cylindrical portion, the disk-shaped portion having an outer diameter and having an upper surface, said information bearing disk fixedly connected to said rotor such that a first surface of said information bearing disk substantially abuts said upper surface of said disk-shaped portion;
   a clamp connected to the cylindrical portion, said clamp having an outer diameter smaller than said outer diameter of the disk shaped portion of the rotor, said clamp connecting said information bearing disk to said upper surface;
   an actuator disposed in said housing adjacent said information bearing disk; and
   a read/write head disposed on said actuator adjacent a second surface of said information bearing disk;
   wherein said actuator is movable to position said read/write head such that said read/write head reads information from or writes information to a portion of said second surface of said information bearing disk located between said outer diameter of the disk-shaped portion of the rotor and said outer diameter of the clamp.

2. An architecture for a low profile rigid disk drive device according to claim 1, wherein said information bearing disk has a diameter of about 1.8 inches and a thickness of about 0.6 mm.

3. An architecture for a low profile rigid disk drive device according to claim 1, wherein a thickness from a lower surface of said spindle motor to said upper surface of said rotor is about 5 mm.

4. An architecture for a low profile rigid disk drive device according to claim 3, wherein a thickness measured from a bottom of said spindle motor to a top of said read/write head is about 7.1 mm.

5. An architecture for a low profile rigid disk drive device having two information bearing disks comprising:
   a housing;
   a spindle motor disposed in said housing, said spindle motor defining a first thickness, said spindle motor having a rotor, said rotor including:
   a rotor shaft,
   a cap connected to one end of the rotor shaft,
   a cylindrical portion having a first end connected to the cap, the cylindrical portion being coaxial with the rotor shaft, and
   a disk-shaped portion connected to a second end of the cylindrical portion, the disk-shaped portion having an outer diameter and having an upper surface, a first one of said two information bearing disks fixedly connected to said rotor such that a first surface of said first information bearing disk substantially abuts said upper surface of said disk-shaped portion, said first information bearing disk also having a second surface opposite said first surface;
   a second one of said two information bearing disks fixedly connected to said rotor on a side of said first information disk opposite said spindle motor, said second information bearing disk having a third surface facing said second surface and a fourth surface;
   a clamp, having an outer diameter smaller than said outer diameter of the disk-shaped portion of the rotor, connected to the cylindrical portion between said first information bearing disk and said second information bearing disk;
   an actuator disposed in said housing adjacent said information bearing disks; and
   a first read/write head fixedly connected to said actuator and disposed adjacent said second surface; and
   a second read/write head fixedely connected to said actuator and disposed adjacent said third surface;
   wherein said actuator is movable to position said first and second read/write heads such that said first read/write head reads information from or writes information to a portion of said second surface located between said outer diameter of the disk-shaped portion of the rotor and said outer diameter of the clamp.

6. An architecture of claim 5 further comprising a third read/write head fixedly connected to said actuator and disposed adjacent said fourth surface.

7. An architecture for a low profile rigid disk drive device according to claim 5, wherein said information bearing disk has a diameter of about 1.8 inches and a thickness of about 0.6 mm.

8. An architecture for a low profile rigid disk drive device according to claim 5, wherein a thickness measured from a lower surface of said spindle motor to said upper surface of said rotor is about 5 mm.

9. An architecture for a low profile rigid disk drive device according to claim 8, wherein a thickness measured from a bottom of said spindle motor to a top of said third read/write head is about 10.7 mm.

* * * * *